(12) United States Patent
Carolus et al.

(10) Patent No.: US 10,672,135 B2
(45) Date of Patent: Jun. 2, 2020

(54) DEVICE AND METHODS FOR PROCESSING COMPUTER TOMOGRAPHY IMAGING DATA

(71) Applicant: KONINKLIJKE PHILIPS N.V., Eindhoven (NL)

(72) Inventors: Heike Carolus, Hamburg (DE); Sven Kabus, Hamburg (DE); Tobias Klinder, Uelzen (DE); Holger Schmitt, Luetjensee (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 20 days.

(21) Appl. No.: 15/737,325

(22) PCT Filed: Jun. 30, 2016

(86) PCT No.: PCT/EP2016/065286
§ 371 (c)(1),
(2) Date: Dec. 18, 2017

(87) PCT Pub. No.: WO2017/001551
PCT Pub. Date: Jan. 5, 2017

(65) Prior Publication Data
US 2018/0165819 A1 Jun. 14, 2018

(30) Foreign Application Priority Data
Jun. 30, 2015 (EP) .................................... 15174530

(51) Int. Cl.
*G06T 7/38* (2017.01)
*G06T 11/00* (2006.01)

(52) U.S. Cl.
CPC .............. *G06T 7/38* (2017.01); *G06T 11/008* (2013.01); *G06T 2207/10076* (2013.01); *G06T 2207/30104* (2013.01); *G06T 2211/404* (2013.01)

(58) Field of Classification Search
CPC ... G06T 7/38; G06T 11/008; G06T 2211/404; G06T 2207/10076; G06T 2207/30104
See application file for complete search history.

(56) References Cited

U.S. PATENT DOCUMENTS

| | | | |
|---|---|---|---|
| 6,424,692 B1 * | 7/2002 | Suzuki | A61B 6/032 378/19 |
| 7,366,336 B2 | 4/2008 | Hristov | |
| (Continued) | | | |

OTHER PUBLICATIONS

Jensen, et al., "Prediction and Reduction of Motion Artifacts in Free-Breathing Dynamic Contrast Enhanced CT Perfusion Imaging of Primary and Metastatic Intrahepatic Tumors", Academic Radiology, vol. 20, No. 4, Mar. 15, 2013.

(Continued)

*Primary Examiner* — Jon Chang
(74) *Attorney, Agent, or Firm* — Larry Liberchuk

(57) ABSTRACT

The invention relates to a device for processing CT imaging data, comprising a processing unit, which is configured to receive a plurality of sets of CT imaging data recorded at different imaging positions and at different points in time. Furthermore, the processing device is configured to provide a plurality of auxiliary sets of CT imaging data, each auxiliary set of CT imaging data comprising processed image data allocated to spatial positions inside a respective spatial section of the object space, wherein a given one of the spatial sections contains those spatial positions which are covered by those sets of CT imaging data acquired at a respective one of the imaging positions, and to generate the (Continued)

processed image data for a given spatial position using those of the sets of CT imaging data acquired at the respective one of the imaging positions.

9 Claims, 8 Drawing Sheets

(56) References Cited

U.S. PATENT DOCUMENTS

| | | |
|---|---|---|
| 7,933,377 B2 | 4/2011 | Hsieh |
| 9,002,089 B2 | 4/2015 | Grass |
| 2003/0026469 A1* | 2/2003 | Kreang-Arekul ........ G06K 9/32 382/132 |
| 2012/0219197 A1 | 8/2012 | Piper |
| 2013/0286778 A1* | 10/2013 | Kisner ................... G01N 29/00 367/35 |
| 2014/0354642 A1 | 12/2014 | Wiemker |
| 2016/0247325 A1* | 8/2016 | Yu ........................ A61B 8/5238 |

OTHER PUBLICATIONS

Isola, et al., "Fully automatic non-rigid registration-based local motion estimation for motion-corrected iterative cardiac CT reconstruction", Med Phys. Mar. 2010;37(3):1093-109.

Isola, et al., "Image registration and analysis for quantitative myocardial perfusion: application to dynamic circular cardiac CT", Phys. Med. Biol. 56 (2011) 5925-5947.

\* cited by examiner

DEVICE AND METHODS FOR PROCESSING COMPUTER TOMOGRAPHY IMAGING DATA

CROSS REFERENCE TO RELATED APPLICATIONS

This application is the U.S. National Phase application under 35 U.S.C. § 371 of International Application No. PCT/EP2016/065286, filed Jun. 30, 2016, published as WO 2017/001551 on Jan. 5, 2017, which claims the benefit of European Patent Application Number 15174530.4 filed Jun. 30, 2015. These applications are hereby incorporated by reference herein.

FIELD OF THE INVENTION

The invention is related to a device for processing computed tomography (CT) imaging data, a CT imaging apparatus, a method for processing CT imaging data, a method for operating a CT imaging apparatus, a computer program for controlling a processing unit of a device for processing computer imaging data and to computer program for controlling operation of a CT imaging apparatus.

BACKGROUND OF THE INVENTION

Perfusion CT (PCT) is a technique for assessing information pertaining to the passage of fluid (e.g., blood, lymph, etc.) through anatomical tissue to facilitate identifying a health state of the tissue or other tissue. It involves acquiring sequential images of an anatomical location after the injection of contrast material and allows obtaining vital functional physiology information. However, the anatomical coverage of this technique is per se relatively small. In order to increase the anatomical coverage and at the same time avoid requiring more scan time and a larger amount of contrast material in multiple PCT scans, it is known to operate a CT imaging apparatus in a jog mode. In the jog mode, a scanner table of the CT imaging apparatus is moved back and forth between different neighboring but non-overlapping imaging positions within a single study. Due to breathing motion or other movement of a person or an object (organ, tissue, etc.) under study, gaps or overlaps between different sets of CT imaging data taken at different imaging positions can occur. Thus, the CT imaging data acquired at different times and different imaging positions may not relate well since the size of a gap or overlap between the different sets of CT imaging data acquired at different times and different imaging positions is not known. The original advantage of the jog mode, i.e., a larger anatomical coverage may therefore not be fully achieved.

The publication N. K. G. Jensen et al., "Prediction and Reduction of Motion Artifacts in Free-Breathing Dynamic Contrast Enhanced CT Perfusion Imaging of Primary and Metastatic Intrahepatic Tumors", Academic Radiology, Vol. 20, No. 4, April 2013, pages 414 to 422, describes a method for predicting and reducing motion artifacts in free-breathing liver perfusion computed tomography (CT) scanning with couch shuttling and to compare tumor and liver parenchyma perfusion values. A semiautomatic respiratory motion correction algorithm is applied to align the acquired images along the z-axis. Perfusion maps are generated using the dual-input Johnson-Wilson model. Root mean squared deviation (RMSD) maps of the model fit to the pixel time-density curves are calculated.

U.S. Pat. No. 9,002,089 B2 describes a method of registering a 4D contrast enhanced image data set. The four-dimensional (4D) contrast enhanced image data set covering three spatial dimensions and the time dimension includes image data of the same volume of interest acquired at different time frames with changing contrast enhancement, the volume of interest includes moving structure, and the different time frames correspond to a predetermined motion phase of interest in different motion cycles of the moving structure. The method comprises: registering image data corresponding to a plurality of different timeframes with reference image data from one of the timeframes. The image data and the reference image data correspond to a same volume of interest and different time frames.

SUMMARY OF THE INVENTION

According to a first aspect of the invention, a device for processing CT imaging data is provided. The processing device comprises a processing unit, which is configured to receive a plurality of sets of CT imaging data recorded at different imaging positions and at different points in time, wherein each set of CT imaging data comprises image data regarding a respective imaged fraction of an object space recorded from a respective imaging position at a respective point in time, and coordinate data, to provide a plurality of auxiliary sets of CT imaging data, each auxiliary set of CT imaging data comprising processed image data allocated to spatial positions inside a respective spatial section of the object space, wherein a given one of the spatial sections contains those spatial positions which are covered by those sets of CT imaging data acquired at a respective one of the imaging positions, and to generate the processed image data for a given spatial position using those of the sets of CT imaging data acquired at the respective one of the imaging positions.

The device for processing CT imaging data of the first aspect of the invention is herein also referred to as the processing device. The processing device according to the first aspect of the invention uses those sets of CT imaging data acquired at a given one of the imaging positions to generate one of the auxiliary sets of CT imaging data. This creates respective spatial section of the object space. The given spatial section contains those spatial positions which are covered by those sets of CT imaging data acquired at the given one of the imaging positions. The processing device generates processed image data for the spatial positions inside this spatial section covered by these sets of CT imaging data. Since the sets of CT imaging data acquired at the respective one of the imaging positions are recorded at different points in time, they typically comprise image data acquired at different phases of a periodic motion of the imaged fraction of the object space. An example for such a periodic motion in the field of CT perfusion imaging is the respiration motion of the person or object. This is used to advantage by the processing device of the present invention by providing the processed image data over larger volume of the spatial positions, namely, a volume spanned by the total set of images (sets of CT imaging data) taken at this imaging position. Each spatial section of the object space can be described as defined by an outer envelope of all spatial positions covered by any of the sets of registered CT imaging data recorded at a given imaging position. In other words, a given auxiliary set of CT imaging data covers any spatial position covered by any of the sets of CT imaging data recorded at the given imaging position. As a result, a larger imaged volume can be visualized for a given one of the imaging positions.

Furthermore, image artifacts that in prior-art solutions may occur due to motion of the imaged fraction of the object space can be reduced or eliminated in the processed image data. Generating the processed image data for a given spatial position using those of the sets of CT imaging data acquired at the respective one of the imaging positions allows compensating the mentioned detrimental motion effects.

Thus, the processing device allows achieving an improved visualization of CT imaging data acquired from a given object at different points in time, such as in a jog mode of operation. This improves the performance of application scenarios such as a 4D CT perfusion analysis.

In the following, embodiments of the device for processing CT imaging data according to the first aspect of the invention will be described.

An imaged fraction of the object that corresponds to a given set of CT imaging data can be either a two-dimensional plane or, as it is mostly the case in CT imaging, a three-dimensional volume.

Coordinate data can take different forms. In one example, they allow an allocation of the respective image data to respective spatial positions within the imaged fraction of the object space. In some such embodiments, the coordinate data provides a reference to real-world-coordinates and therefore allow an allocation to absolute positions of the imaged object space. In other embodiments, however, the coordinate data provides a relative reference, thus only allowing an allocation to relative positions, in particular having a relative reference within the given plurality of auxiliary sets of CT imaging data. This is sufficient for instance where a user is able to identify the imaged region by the features visible in the auxiliary sets of CT image data.

To provide such absolute or relative coordinate data, one embodiment of the processing unit is configured to perform, before assembling the auxiliary sets of CT imaging data, a registration of the respective sets of CT imaging data so as to provide registered auxiliary sets of CT imaging data. The processing device of this variant allows an assembling of these registered auxiliary sets of CT imaging data to form a single set of auxiliary CT imaging data. This single set typically is two- or three-dimensional representation of the imaged object and does not allow visualizing the imaged object as a function of time. Registration can be performed by using methods which per se are known in the art, such as registration to a certain reference frame or simultaneous registration.

In one example of such embodiments, the processing unit is configured
to receive the sets of CT imaging data recorded at different imaging positions and at different points in time as unregistered CT imaging data, and
to assign to the image data respective coordinates which provide an allocation to spatial positions of the respective imaged fractions of the object space, so as to form and provide for each set of unregistered CT imaging data a corresponding set of registered CT imaging data.

In this embodiment, thus, the processing unit is configured to register unregistered sets of CT imaging data on its own, and does not rely on previous registration of the CT imaging data by an external device.

The respective coordinates of the image data of a respective set of registered CT imaging data comprise in one variant of this embodiment as one component of the coordinates an allocation of the image data to its respective imaging position. Furthermore, in a variant of this embodiment the respective further coordinate components assigned to the image data of a respective set of registered CT imaging data are indicative of relative positions within the given set of CT imaging data.

A given auxiliary set of CT imaging data in a state after registration, but before generating the processed image data, may be visualized as an overlay of a plurality of individual sets (frames) of CT imaging data taken at the same imaging position, wherein the different frames may be shifted, deformed and/or rotated with respect to each other, depending on the effects of patient motion during the image acquisition. In regions of large overlay, i.e., where a large number of individual frames cover the same fraction of the object space, a corresponding number of different frames can be used to generate the processed image data. In other regions with less overlap, the data basis for generating the processed image data is smaller.

In an embodiment of the processing device the processing unit is further configured to assemble the respective auxiliary sets of CT imaging data so as to form a single set of auxiliary CT imaging data combining the spatial sections of the object space. This form of assembling imaging data is also referred to as stitching.

The single set of auxiliary CT imaging data comprises imaging data regarding all imaged fractions of the object space and thus provides a large volume of object coverage. Since each one of the combined auxiliary sets of CT imaging data is formed by processing a plurality of sets of CT imaging data, image artifacts of respective sets of CT imaging data have a reduced impact on the resulting single set of auxiliary CT imaging data.

Due to object motion during the acquisition of a time series as in 4D CT perfusion studies, auxiliary sets of CT imaging data taken at neighboring imaging positions may cover overlapping spatial sections of the object space. This is used to advantage in one embodiment, in which the processing unit is configured, in assembling the respective auxiliary sets of CT imaging data,
to determine whether at least two of the spatial sections comprise an identical overlapping section of the object space, and
to generate the processed image data for a given spatial position additionally using those sets of CT imaging data acquired at other than the respective one of the imaging positions and comprising at least some imaging data allocated to spatial positions inside the given spatial section of the object space.

For instance, in a situation where the processed image data for spatial positions covered by sets of CT imaging data acquired at neighboring imaging positions, the processed image data for such spatial positions falling into the overlap is generated from both sets. Thus, an improved quality of processed image data and an improved assembling or stitching of the respective auxiliary sets of CT imaging data is achieved.

In a further embodiment, the processing device further comprises a registration unit, which is configured
to receive the sets of CT imaging data recorded at different imaging positions and at different points in time as unregistered CT imaging data, and
to assign to the image data respective coordinates which provide the allocation to spatial positions of the respective imaged fractions of the object space, so as to form and provide for each set of unregistered CT imaging data the corresponding set of registered CT imaging data, and to provide the sets of registered CT imaging data to the processing unit for use, from which the auxiliary sets are derived.

In this embodiment, the processing device has a registration unit separate from the processing unit and also does not rely on previous external registration of the CT imaging data.

In a variant of this embodiment, the coordinates are spatial coordinates. In a further variant, the coordinates indicate a phase of a periodic respiration motion of the object, which enables in combination with information concerning the respective imaging position an allocation to spatial positions. In another variant, the coordinates are derived by a comparison between the imaged fraction of the object space and a predetermined reference fraction of the object space, wherein each predetermined reference fraction corresponds to exactly one imaging position. This variant additionally requires a receiving of the predetermined reference fractions that correspond to the object, by the registration unit. In an example of this variant, each predetermined reference fraction is a single set of CT imaging data recorded at a corresponding imaging position. For instance, registration of the sets of CT imaging data acquired at a given one of the imaging positions is performed with respect to a reference set of CT imaging data, which is formed by either the first set acquired at this imaging position (i.e., at the earliest point in time). Another example is the use of simultaneous registration.

In another embodiment of the processing device, the processing unit is configured to generate the auxiliary CT imaging data for a given spatial position by performing an averaging using image data from those registered sets of CT imaging data covering the given spatial position. In a variant of this embodiment, the averaging comprises an averaging of a grayscale tone value of the image data. Such an averaging is in a first example an arithmetical averaging of the grayscale tone values. In a further example, just grayscale tone values below a certain predetermined tone threshold distance from a mean grayscale tone value are used for the averaging. By averaging, an impact of image artifacts, e.g., due to motion, can be reduced.

In another embodiment the processing unit is configured to generate the auxiliary CT imaging data for a given spatial position by determining and selecting from that image data allocated to the given spatial position and comprised in different sets of CT imaging data either a maximum tone value or a minimum tone value. The determining of a minimum or maximum tone value in this embodiment allows the auxiliary sets of CT imaging data to provide image data with a higher contrast.

In a further embodiment, the processing device is further configured to provide sets of registered CT imaging data, each set comprising imaging time information, which is indicative of a temporal order of the sets of registered CT imaging data with respect to the points in time at which the corresponding sets of CT imaging data have been recorded. Thus, in this embodiment, the processing device provides sets of registered CT imaging data that can be used to generate time resolved sequences of an imaged fraction of the object space.

In a further embodiment, the processing device is further configured to receive a user input information indicative of a chosen processing scheme for generating the auxiliary CT imaging data for a given spatial position, wherein the chosen processing scheme is one of the group of an averaging using corresponding image data, a selecting of maximum tone values, or a selecting of minimum tone values. In this embodiment, a user can determine or switch the processing scheme for generating the auxiliary CT imaging data and thus adapt the processing scheme to the imaged object space. Furthermore, the user can select and use all different processing schemes to compare the image information according to the differently generated sets of auxiliary CT imaging data for obtaining more information for image analysis.

The processing device can be provided in the form of a hardware module with dedicated circuitry or as a programmable processor with suitable executable software code. This allows updating or upgrading a prior-art CT imaging apparatus so as to additionally provide the functionality disclosed herein.

According to a second aspect of the invention, the invention relates to a CT imaging apparatus, comprising a CT image acquisition unit, which is configured to generate and provide a plurality of sets of CT imaging data recorded at different imaging positions and at different points in time, wherein each set of CT imaging data comprises image data regarding a respective imaged fraction of an object space recorded from a respective imaging position at a respective point in time, and coordinate data, and a device for processing CT imaging data according to the first aspect of the invention or one of its embodiments.

The CT imaging apparatus according to the second aspect of the invention shares the advantages of the processing device according to the first aspect of the invention.

The CT imaging apparatus according to the second aspect of the invention comprises a data connection for providing the sets of CT imaging data, which are later on processed by the device for processing CT imaging data. In an embodiment, the data connection is provided via a cable. In another embodiment, the data connection is provided wirelessly or by means of a manually exchangeable memory.

In a further embodiment the CT imaging apparatus comprises a control processor, which is configured to control an acquisition of the sets of CT imaging data by the CT image acquisition unit in a jog mode of operation by periodically moving the CT image acquisition unit to imaging positions of a predetermined set of imaging positions and triggering acquisition of a respective set of CT imaging data from a given imaging position before moving to the next imaging position. The CT imaging apparatus of this embodiment thus allows a controlled recording of sets of CT imaging data at different imaging positions and at different points in time, as required by the device for processing CT imaging data for generating the processed image data as described above. In a variant of this embodiment, the CT image acquisition unit can be controlled to trigger the acquisition of respective sets of CT imaging data more often at imaging positions that are of higher importance for a user of the CT imaging apparatus. In a further variant of this embodiment, the CT image acquisition unit is mounted below a moveable table, which is moved back and forth for periodically changing the imaging positions. In this variant, the corresponding imaging positions can be reproduced precisely by moving the table with the CT image acquisition unit to respective predetermined positions.

In another embodiment of the CT imaging apparatus, the CT image acquisition unit is further configured to determine for each set of CT imaging data respective imaging time information, which is indicative of a point in time when the respective set of CT imaging data has been recorded. In a variant of this embodiment, the determining and a providing of the imaging time information is advantageous for the assigning of respective coordinates which provide an allocation to spatial positions to the image data. In this variant, the phase of a periodic motion of the object is determined as respective coordinate, by considering the periodic motion according to the imaging time information.

In a further embodiment of the CT imaging apparatus, a user input interface is provided, which is arranged and configured to receive user input information indicative of a user-selected processing scheme for generating the auxiliary CT imaging data. As described before, the processing scheme is for instance one of the group of an averaging process, a selection of maximum tone values, or a selection of minimum tone values.

In an embodiment of the CT imaging apparatus, the CT imaging device further comprises an output unit, arranged to receive the single set of auxiliary CT imaging data and to output the single set of auxiliary CT imaging data as a graphical output for visualization. Preferably, the output unit has a display configured to output the single set of auxiliary CT imaging data. In a further variant, the output unit is configured to provide a the graphical output in the form of a print-out.

According to a third aspect of the invention, the invention relates to a method for processing CT imaging data. The method comprises receiving a plurality of sets of CT imaging data recorded at different imaging positions and at different points in time, wherein each set of CT imaging data comprises image data regarding a respective imaged fraction of an object space recorded from a respective imaging position at a respective point in time, and coordinate data, providing a plurality of auxiliary sets of CT imaging data, each auxiliary set of CT imaging data comprising processed image data allocated to spatial positions inside a respective spatial section of the object space, wherein a given one of the spatial sections contains those spatial positions which are covered by those sets of CT imaging data acquired at a respective one of the imaging positions, and generating the processed image data for a given spatial position using those of the sets of CT imaging data acquired at the respective one of the imaging positions.

The method according to the third aspect of the invention shares the advantages of the processing device according to the first aspect of the invention.

In an embodiment of the method, the method further comprises the step of assembling the respective auxiliary sets of CT imaging data so as to form a single set of auxiliary CT imaging data combining the spatial sections of the object space.

In a further embodiment of the method according to the fourth aspect of the invention, the assembling of the respective auxiliary sets of CT imaging data comprises determining whether at least two of the spatial sections comprise an identical overlapping section of the object space, and generating the processed image data for a given spatial position additionally using those sets of CT imaging data acquired at other than the respective one of the imaging positions and comprising at least some imaging data allocated to spatial positions inside the given spatial section of the object space.

According to a fourth aspect of the invention, a method for operating a CT imaging apparatus is provided, comprising controlling a CT image acquisition unit of the CT imaging apparatus in generating and providing a plurality of sets of CT imaging data at different imaging positions and at different points in time, wherein each set of CT imaging data comprises image data regarding a respective imaged fraction of an object space recorded from a respective imaging position at a respective point in time, and coordinate data, and processing the CT imaging data according the method of the third aspect of the invention.

The method according to the fourth aspect of the invention shares the advantages of the processing device according to the first aspect of the invention.

According to a fifth aspect of the invention, the invention relates to a computer program for controlling a processing unit of a device for processing computed tomography imaging data, comprising program code means for causing the processing unit to carry out a method according to the third aspect of the invention or one of its embodiments.

According to a sixth aspect of the invention, the invention relates to a computer program for controlling operation of a CT imaging apparatus, comprising program code means for causing a control processor of the CT imaging apparatus to control operation of the CT imaging apparatus in accordance with a method according to the fourth aspect of the invention.

The processing unit or control processor for instance forms an integrated part of a CT imaging apparatus and can be implemented as a microcontroller or as a microprocessor. In another embodiment, the processing unit or control processor forms is not part of CT imaging apparatus, but for instance an integrated part of a hospital computer system for analyzing previously acquired CT imaging data.

It shall be understood that the device for processing CT imaging data of the first aspect of the invention, the CT imaging device of the second aspect, the method for processing CT imaging data of the third aspect, the method for operating a CT imaging apparatus of the fourth aspect of the invention, the computer program for controlling a processing unit of a device for processing computer tomography imaging data of the fifth aspect, and the computer program for controlling operation of a CT imaging apparatus of the sixth aspect of the invention, have similar or identical embodiments.

Further embodiments will be described below with reference to the enclosed drawings.

DETAILED DESCRIPTION OF EMBODIMENTS

Figure 1:
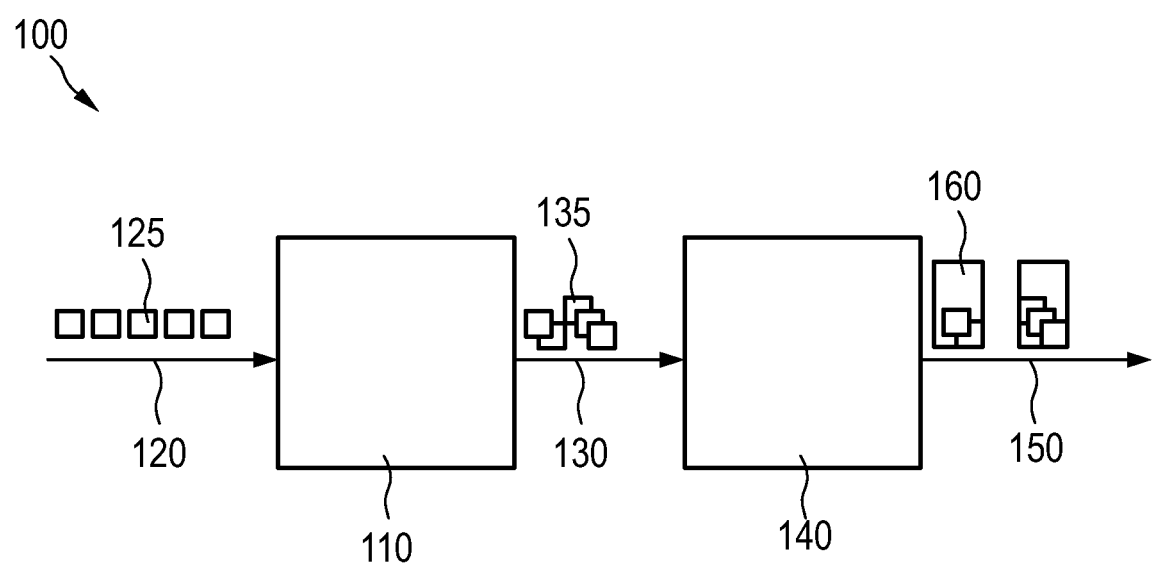
FIG. 1 shows a first embodiment of a device for processing CT imaging data according to a first aspect of the invention.

FIG. 1 shows a first embodiment of a device for processing CT imaging data 100. The device for processing CT imaging data, hereinafter processing device 100 comprises a registration unit 110 which is configured to receive sets of CT imaging data recorded at different imaging positions and at different points in time as unregistered CT imaging data 120. The registration unit 110 is further configured to assign to the image data respective coordinates which provide an allocation to spatial positions of the respective imaged fractions 125 of the object space, so as to form and provide for each set of unregistered CT imaging data 120 a corresponding set of registered CT imaging data 135, and to provide the sets of registered CT imaging data to a processing unit 140, as indicated by an arrow 130.

The processing unit 140 is configured to receive a plurality of the sets of registered CT imaging data 135 and to generate and provide a plurality of auxiliary sets of CT imaging data 160, each auxiliary set of CT imaging data 160 being allocated to a spatial position inside a respective spatial section of the object space, wherein a given one of the spatial sections contains those spatial positions which are covered by those sets of registered CT imaging data 135 acquired at a respective one of the imaging positions.

Furthermore, the processing unit 140 is configured to generate the processed image data for a given spatial position using those of the sets of registered CT imaging 135 data acquired at the respective one of the imaging positions. The total number of auxiliary sets of CT imaging data is thus equal to the number of imaging positions used during the original acquisition of the sets of CT imaging data. For sets acquired in a jog mode of operation, such overlaying of sets of CT imaging data according to their respective imaging position will typically find a strong overlap of the acquired sets in a center fraction of the overall volume covered by the sets acquired at a given imaging position, while in boundary regions of that overall volume image data less sets will be available. This is due to the issue of object motion described earlier. Thus, a given set of auxiliary CT imaging data covers an envelope volume containing all volumes covered by the original sets acquired at the given imaging position.

The auxiliary sets of CT imaging data 160 are provided for visualization, for instance on a display, as indicated by an arrow 150.

Figure 2:
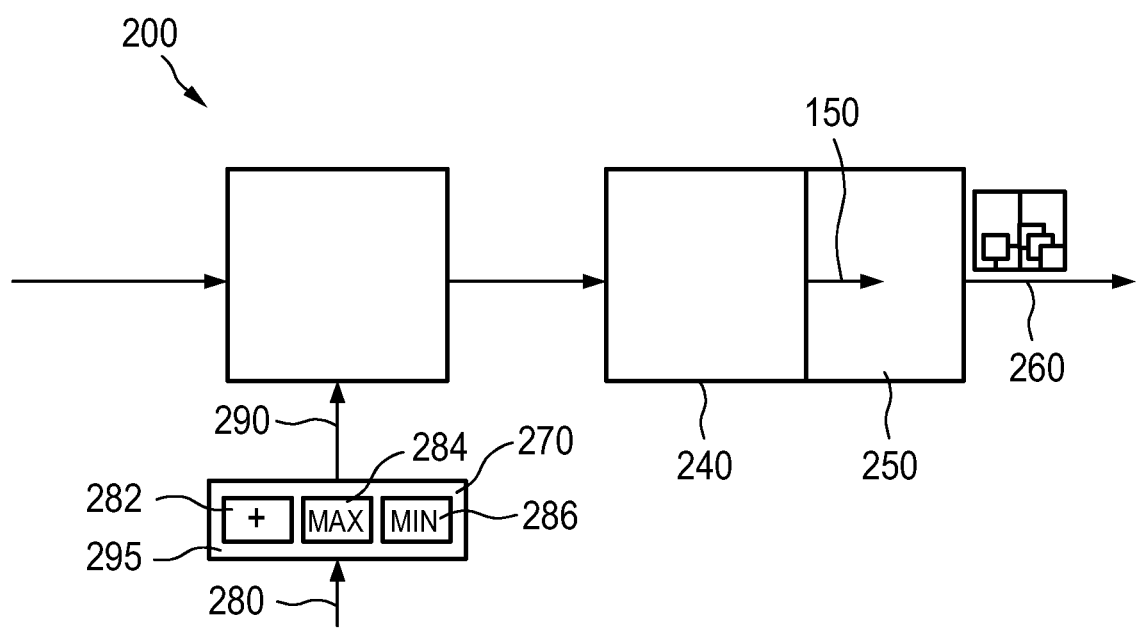
FIG. 2 shows a second embodiment of the device for processing CT imaging data according to the first aspect of the invention.

FIG. 2 shows a second embodiment of a device for processing CT imaging data 200 according to the first aspect of the invention.

The processing device 200 is similar to the device for processing CT imaging data 100 shown in FIG. 1, but in addition, the depicted second embodiment comprises a stitching unit 250 and a user interface 270.

The stitching unit 250 forms a part of the processing unit 240 and is configured to receive the auxiliary sets of CT imaging data 150, which were generated as described in the context of FIG. 1. After receiving the auxiliary sets of registered CT imaging data 150, the stitching unit 250 assembles the respective auxiliary sets of CT imaging data 150 so as to form a single set of auxiliary CT imaging data 260, combining the spatial sections of the object space. For this step the information derivable from the auxiliary sets with respect to their position relative to each other is used. From this and the prior registration the position of each auxiliary set relative to the object, e.g., the patient can be determined. Finally, the correctly assembled auxiliary set of CT imaging data 260 is provided by the stitching unit 250.

Depending on the exact volume coverage of the auxiliary sets, the assembled auxiliary set may contain one or more gaps, for which no image data is available. To avoid gaps, one variant uses predetermined imaging positions selected to guarantee a minimum overlap of spatial positions of the object space covered.

However, overlaps between the auxiliary sets are not desired in the assembled set of processed image data after stitching. They can be removed by the stitching unit. This is in one variant achieved by generating the processed image data for a given spatial position additionally using those sets of CT imaging data acquired at other than the respective one of the imaging positions and comprising at least some imaging data allocated to spatial positions inside the given spatial section of the object space. To avoid unnecessary double computation based on such overlapping image information for different auxiliary sets covering the overlap, the respective spatial positions are excluded from one of the concerned auxiliary sets of CT imaging data so as to provide a seamless assembled set.

As a further difference in comparison to the device for processing CT imaging data 100 that is shown in FIG. 1, the embodiment depicted in FIG. 2 comprises the user input interface 270, which is arranged and configured to receive a user input 280 and to provide user input information 290. The user input 280 is indicative of a selected processing scheme for generating the auxiliary sets of CT imaging data for a given spatial position. The user input 280 in the embodiment of FIG. 2 is possible by means of a touch screen 295. In other embodiments not shown, the user input is provided by operation of a switch or buttons. The chosen processing scheme is for instance one of the group comprising an averaging using corresponding image data 282, a selecting of maximum tone values 284, or a selecting of minimum tone values 286. Other known processing schemes that combine the image data gathered at different times at the respective imaging position may of course be used.

Figure 3A:
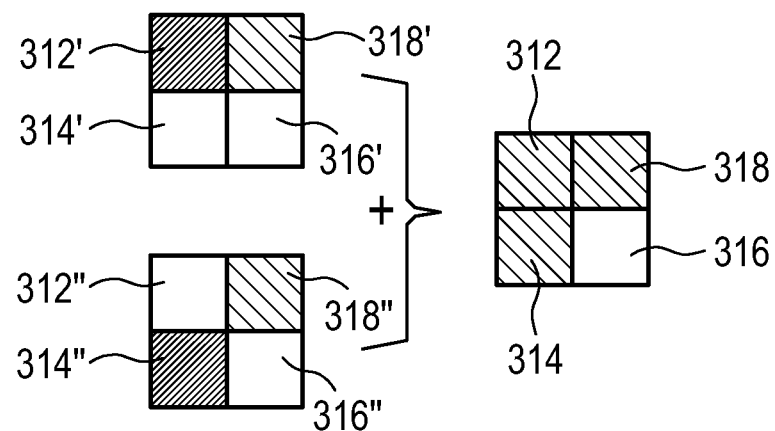
FIG. 3a shows a scheme for generating auxiliary CT imaging data by averaging tone information according to the first aspect of the invention.
Figure 3B:
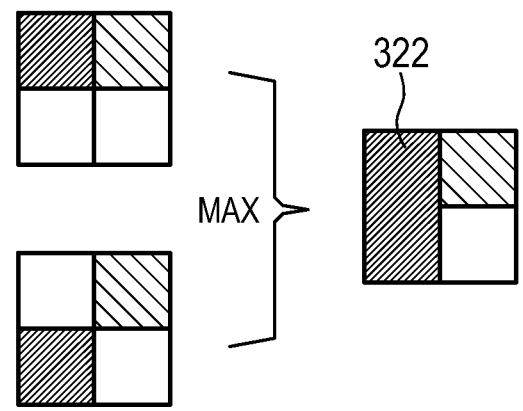
FIG. 3b shows a scheme for generating auxiliary CT imaging data by storing maximal values of the tone according to the first aspect of the invention.
Figure 3C:
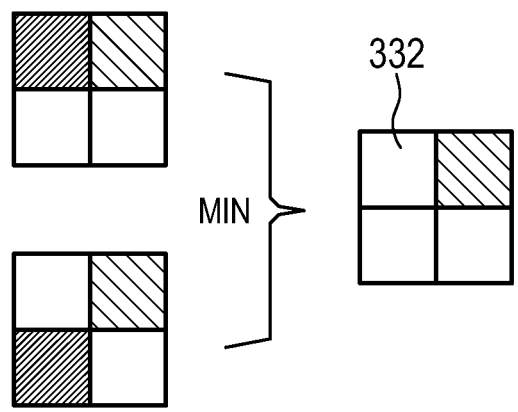
FIG. 3c shows a scheme for generating auxiliary CT imaging data by storing minimal values of the tone according to the first aspect of the invention.

FIG. 3a, 3b, 3c illustrate different alternative schemes for generating the processed image data, each scheme using, by way of example, a strongly simplified grey tone scale.

FIG. 3a shows a scheme for generating processed image data by averaging tone information. The averaging process is shown for four spatial positions 312, 314, 316, 318 with a first set of CT imaging data indicative of a tone of the spatial positions 312', 314', 316', 318' and a second set of CT imaging data indicative of the tone of the spatial positions 312", 314", 316", 318". A black tone provided with the first set of CT imaging data for the spatial position 312' is averaged with a white tone of the corresponding spatial position 312" to a resulting grey tone of the spatial position 312 provided by the auxiliary set of registered CT imaging data. The further spatial positions 314, 316, 318 are averaged analogously.

FIG. 3b shows a further scheme for generating auxiliary registered CT imaging data, involving determining and selecting maximal tone values. In contrast to the averaging process described in FIG. 3a, generating a tone for the spatial position 322 by determining and selecting maximum tone values comprises comparing a black tone and a white tone of the corresponding spatial positions 312' and 312" indicated by the first and second set of CT imaging data. As a result, the present scheme leads to selection of the black tone of the spatial position 322 in the auxiliary set of registered CT imaging data, since black forms a maximum tone value on the grey tone scale.

FIG. 3c shows a further scheme for generating auxiliary registered CT imaging data, involving determining and selecting minimal tone values. In contrast to the averaging process described in FIG. 3a, generating a tone of the spatial position 332 by determining and selecting minimal tone value leads to a white tone of the spatial position 332 provided by the auxiliary set of registered CT imaging data, since white is the minimal tone value.

Figure 4:
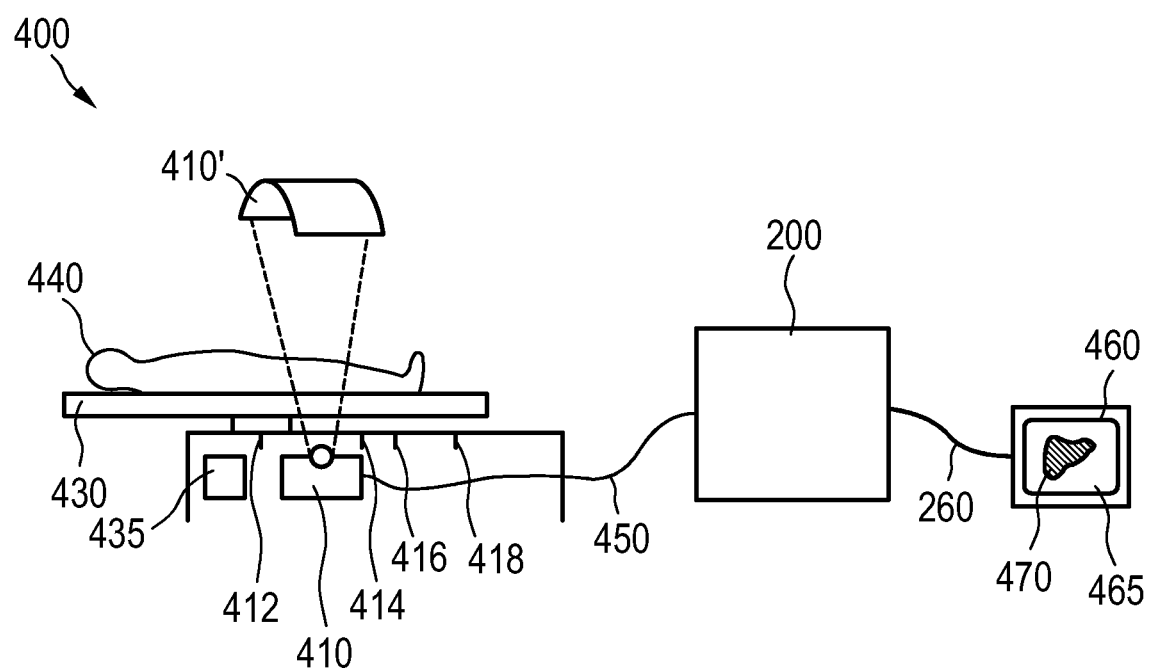
FIG. 4 shows an embodiment of a CT imaging apparatus according to a second aspect of the invention.

FIG. 4 shows an embodiment of a CT imaging apparatus 400. The CT imaging apparatus 400 comprises a CT image acquisition unit 410, which is configured to generate and provide a plurality of sets of CT imaging data recorded at different imaging positions 412, 414, 416, 418 and at different points in time by moving from imaging position to imaging position. The CT image acquisition unit 410 is mounted below a moveable table 430 so as to image a patient or object 440 positioned on the table. The different imaging positions thus correspond to different positions of the table 430 with respect to the CT image acquisition unit 410. The overall number and exact positions of the imaging positions can be determined by a user prior to operation of the CT imaging apparatus according to the given imaging task. A relative position of the CT image acquisition unit 410 with respect to the table 430 is controlled by a control processor 435. The control processor 435 is configured to control an acquisition of the sets of CT imaging data by the CT image acquisition unit 410. In particular, one provided option for operation is a jog mode of operation for performing CT perfusion studies. The jog mode involves periodically toggling the relative position of the CT image acquisition unit 410 with respect to the moveable table 430, stopping at the imaging positions 412, 414, 416, 418 for a predetermined time span (for example 4 seconds) and acquiring a respective set of CT imaging data at each stop during this time span.

The CT imaging apparatus comprises a device for processing CT imaging data, which in this non-limiting example is the processing device 200 described above in the context of FIG. 2. The sets of CT imaging data are provided to the processing device 450 via a suitable data connection 450.

For visualization in one of a plurality of modes of operation provided by the CT imaging apparatus 400, the processing device 200 delivers the assembled set of auxiliary CT imaging data via a suitable data connection 260 to an output unit in the form of a display device 460. The display device 460 is configured to provide a graphical output 470 of the assembled single set of auxiliary CT imaging data 260 on a screen 465.

Figure 5:
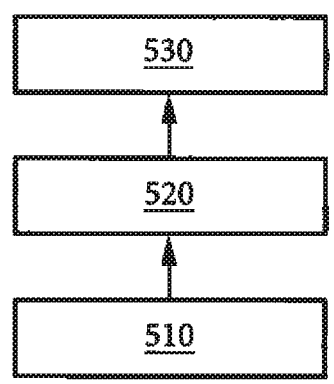
FIG. 5 shows a block diagram of a first embodiment of a method for processing CT imaging data according to a third aspect of the invention.

FIG. 5 shows a flow diagram of a first embodiment of a method for processing CT imaging data according to a third aspect of the invention.

The method comprises a step 510 of receiving sets of CT imaging data recorded at different imaging positions and at different points in time, wherein each set of CT imaging data comprises image data regarding a respective imaged fraction of an object space recorded from a respective imaging position at a respective point in time, and coordinate data.

A subsequent step 520 comprises a grouping of those respective sets of CT imaging data which are acquired at a given one of the imaging positions. A given group thus contains those sets of CT imaging data which were acquired at one imaging position.

In a subsequent step 530, the method proceeds with generating the processed image data for a given spatial position based on the previously performed grouping. In particular, a given group of those of the sets of CT imaging data acquired at the respective one of the imaging positions is used to determine the processed image data for a given spatial position covered by the given group. As described above, generating of the processed image data for a given spatial position for instance comprises an averaging of tone information or a selecting of maximal tone values or a selecting of minimal tone values according to the corresponding CT imaging data of the sets of registered CT imaging data.

Figure 6:
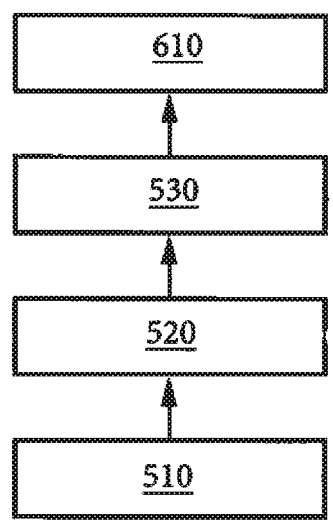
FIG. 6 shows a block diagram of a second embodiment of the method for processing CT imaging data according to the third aspect of the invention.

FIG. 6 shows a flow diagram of a second embodiment of the method for processing CT imaging data. In addition to the steps 510 to 530 of the method shown in FIG. 5, the method of FIG. 6 comprises a stitching step 610, comprising assembling the auxiliary sets of CT imaging data so as to form a single set of auxiliary CT imaging data combining their covered spatial sections of the object space. Through the achieved knowledge of the relative position of the volumes covered by the auxiliary sets relative to each other and the knowledge of the position of each original set of CT imaging data within the given volume, the relative position of all volumes to each other is known and they can be assembled correctly. In particular, temporally averaged or interpolated auxiliary sets of CT imaging data can thus be combined to form a volume showing the entire field of view. In the case of no overlap between the auxiliary sets of CT imaging data, necessary gaps between the images corresponding to the auxiliary sets are introduced by the present method. It is an advantage of this method that the finally displayed volumes of image data in the form of voxels at each spatial position correspond and can be used directly to estimate the perfusion voxel-wise.

Figure 7:
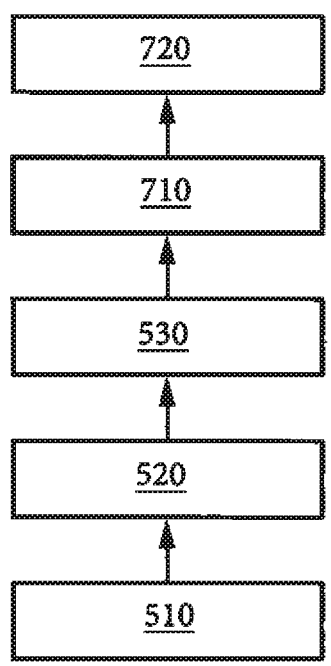
FIG. 7 shows a block diagram of a third embodiment of the method for processing CT imaging data according to the third aspect of the invention.

FIG. 7 shows a flow diagram of a third embodiment of the method for processing CT imaging data. The method includes a particular stitching approach. In addition to the steps 510 to 530 of the method of FIG. 5, two additional steps are performed in the context of stitching. A step 710 comprises determining whether at least two of the spatial sections covered by a given pair of auxiliary sets of CT imaging data comprise an identical overlapping section of the object space. A step 720 comprises generating the processed image data for a given spatial position by additionally using those sets of CT imaging data acquired at other than the respective one of the imaging positions. Such sets of CT imaging data thus comprise at least some imaging data allocated to spatial positions inside the given spatial section of the object space, which is also covered from another imaging position, typically a neighboring imaging position. For the example of averaging, this embodiment uses the determined overlap to include all image data available for a given spatial position in the determination of the averaged processed image data for this spatial position meant for display.

It is noted that for the purpose of viewing on a display or printout, the auxiliary sets are preferably deformed by rigid transformations only, i.e., translation or rotation, since in general doctors prefer seeing the original over non-rigidly deformed images. In a further embodiment, however, deformed images obtained by the registration are fused if suitable for the given viewing application.

Figure 8:
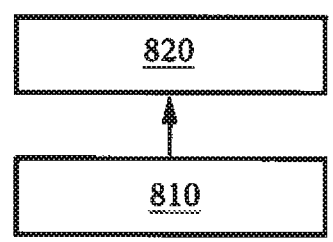
FIG. 8 shows a block diagram of an embodiment of a method for operating a CT imaging apparatus according to a fourth aspect of the invention.

FIG. 8 shows a block diagram of an embodiment of a method for operating a CT imaging apparatus according to a fourth aspect of the invention. The method a step 810 of controlling a CT image acquisition unit of the CT imaging apparatus in generating and providing a plurality of sets of CT imaging data at different imaging positions and at different points in time. As described before, each set of CT imaging data comprises image data regarding a respective imaged fraction of an object space recorded from a respective imaging position at a respective point in time, and coordinate data. A step 820 comprises processing the CT imaging data according to the method shown in one of the FIGS. 5 to 7.

In summary, the invention relates to a device for processing CT imaging data, comprising a processing unit, which is configured to receive a plurality of sets of CT imaging data recorded at different imaging positions and at different points in time, wherein each set of CT imaging data comprises image data regarding a respective imaged fraction of an object space. Furthermore, the processing device is configured to provide a plurality of auxiliary sets of CT imaging data, each auxiliary set of CT imaging data comprising processed image data allocated to spatial positions inside a respective spatial section of the object space, wherein a given one of the spatial sections contains those spatial positions which are covered by those sets of CT imaging data acquired at a respective one of the imaging positions, and to generate the processed image data for a given spatial position using those of the sets of CT imaging data acquired at the respective one of the imaging positions.

The invention is not limited to the disclosed embodiments. In particular the invention is not restricted to a use within a CT imaging device. Any reference signs in the claims should not be construed as limiting the scope.

The invention claimed is:

1. A device for processing computed tomography (CT) imaging data, comprising:
at least one processor configured to:
receive a plurality of frames of the CT imaging data recorded at different non-overlapping imaging positions and at different points in time, wherein a particular frame of the CT imaging data comprises a particular portion of an object space recorded from a particular imaging position at a particular point in time;
provide a plurality of auxiliary sets of the CT imaging data based on the received plurality of frames of the CT imaging data, wherein a particular auxiliary set of the CT imaging data comprises at least two frames of the CT imaging data recorded at the same particular imaging position at different points in time; and
generate image data for a given spatial position by processing the particular auxiliary set of the CT imaging data.

2. The device of claim 1, wherein the at least one processor is further configured to assemble the plurality of auxiliary sets of the CT imaging data to form a single set of auxiliary CT imaging data which represents voxels at the given spatial position.

3. The device of claim 1, further comprising a registration processor configured to:
receive the plurality of frames of the CT imaging data recorded at the different non-overlapping imaging positions and at the different points in time as unregistered CT imaging data;
assign respective coordinates which provide an allocation to spatial positions of the respective imaged portions of the object space, so as to form for each frame of the unregistered CT imaging data a corresponding frame of registered CT imaging data; and
provide the frames of the registered CT imaging data to the at least one processor.

4. The device of claim 1, wherein the at least one processor is further configured to generate the image data for the given spatial position by averaging the particular auxiliary set of the CT imaging data at the given spatial position.

5. The device of claim 1, wherein the image data comprises a tone value, and wherein the at least one processor is further configured to generate the image data for the given spatial position by selecting a maximum tone value or a minimum tone value in the particular auxiliary set of the CT imaging data at the given spatial position.

6. A computed tomography (CT) imaging apparatus, comprising:
a CT image acquisition unit configured to acquire CT imaging data; and
a device for processing the CT imaging data, comprising:
at least one processor configured to:
receive a plurality of frames of the CT imaging data recorded at different non-overlapping imaging positions and at different points in time, wherein a particular frame of the CT imaging data comprises a particular portion of an object space recorded from a particular imaging position at a particular point in time;
provide a plurality of auxiliary sets of the CT imaging data based on the received plurality of frames of the CT imaging data, wherein a particular auxiliary set of the CT imaging data comprises at least two frames of the CT imaging data recorded at the same particular imaging position at different points in time; and
generate image data for a given spatial position by processing the particular auxiliary set of the CT imaging data.

7. The CT imaging apparatus of claim 6, further comprising a control processor configured to control an acquisition of the CT imaging data by the CT image acquisition unit in a jog mode by periodically moving the CT image acquisition unit to the different non-overlapping imaging positions and triggering the acquisition of the at least two frames of the CT imaging data from the particular imaging position before moving to a subsequent imaging position.

8. A method for processing computed tomography (CT) imaging data, comprising:
receiving a plurality of frames of the CT imaging data recorded at different non-overlapping imaging positions and at different points in time, wherein a particular frame of the CT imaging data comprises a particular portion of an object space recorded from a particular imaging position at a particular point in time;
providing a plurality of auxiliary sets of the CT imaging data based on the received plurality of frames of the CT imaging data, wherein a particular auxiliary set of the CT imaging data comprises at least two frames of the CT imaging data recorded at the same particular imaging position at different points in time; and
generating image data for a given spatial position by processing the particular auxiliary set of the CT imaging data.

9. The method of claim 8, further comprising assembling the plurality of auxiliary sets of the CT imaging data to form a single set of auxiliary CT imaging data which represents voxels at the given spatial position.

\* \* \* \* \*